United States Patent [19]

Yasuda et al.

[11] Patent Number: 4,611,682
[45] Date of Patent: Sep. 16, 1986

[54] MOTOR-DRIVEN POWER STEERING SYSTEM

[75] Inventors: Tomino Yasuda, Kasukabe; Akio Hashimoto, Kawasaki, both of Japan

[73] Assignee: Aisin Seiki Kabushiki Kaisha, Japan

[21] Appl. No.: 638,669

[22] Filed: Aug. 8, 1984

[30] Foreign Application Priority Data

Aug. 8, 1983 [JP] Japan ................................ 58-144796

[51] Int. Cl.⁴ ...................... B62D 5/04; G05D 17/02
[52] U.S. Cl. ................................... 180/79.1; 318/334; 318/473; 318/488; 361/24
[58] Field of Search ............... 180/79.1; 318/334, 473, 318/488; 361/24

[56] References Cited

U.S. PATENT DOCUMENTS

| | | | |
|---|---|---|---|
| 3,955,130 | 5/1976 | Graf | 318/434 X |
| 4,034,415 | 7/1977 | Suer | 361/24 |
| 4,066,945 | 1/1978 | Korte, Jr. | |
| 4,300,081 | 11/1981 | Van Landingham | |
| 4,471,280 | 9/1984 | Stack | 180/79.1 X |
| 4,530,413 | 7/1985 | Buike | 180/79.1 |
| 4,532,567 | 7/1985 | Kade | 180/79.1 X |

FOREIGN PATENT DOCUMENTS 0124790 11/1984 European Pat. Off. .
3402332 8/1984 Fed. Rep. of Germany .

*Primary Examiner*—Robert G. Nilson
*Attorney, Agent, or Firm*—Banner, Birch, McKie & Beckett

[57] ABSTRACT

An improved electric power steering system is disclosed. The system includes an electric motor as a driving device. Input system torque, motor current flow and motor temperature are detected and used to control the motor to prevent premature failure of the system due to elevated temperatures in the vehicle engine compartment.

17 Claims, 11 Drawing Figures

MOTOR-DRIVEN POWER STEERING SYSTEM

BACKGROUND OF THE INVENTION

The present invention relates generally to the field of motor vehicles and, more particularly, is directed to an improved motor-driven power assist system for steering vehicles.

Power steering systems for motor vehicles are well-known in the prior art. Such systems generate an auxiliary steering force in accordance with steering by the driver and the force thus generated is transmitted to a steering gear which turns the wheels. Most of the power steering systems in use at the present time are actuated by a hydraulic drive. The hydraulic drive is equipped with a control valve, hydraulic cylinder and related structure which generates an auxiliary steering force by moving hydraulic fluid within the cylinder in accordance with steering by the driver.

A significant disadvantage of hydraulic power steering systems, especially in light of the trend toward smaller cars, is that the control valve, hydraulic cylinder and related structure are large in size. The hydraulic lines must also be formed with a small curvature to prevent pressure loss in the system. In the case of vehicles not having a large mounting space in the engine compartment, such as front wheel drive vehicles, these constraints make it difficult to mount hydraulic power steering systems. Hydraulic systems must also be effectively sealed to prevent fluid leakage. Thus, the maintenance and installation of hydraulic power steering systems is quite troublesome.

In order to avoid the above-identified problems, it has been proposed to use an electric motor as the driving means for power steering systems. While motor-driven steering systems represent a significant improvement over hydraulic systems, electric motors are prone to a high failure rate at elevated temperatures. These failures have chiefly to do with break-down of the electrical insulation in the motor due to heat, causing the motor to burn out.

Because power steering assist devices must often be installed in the vehicle's engine compartment where relatively high temperatures are expected, the problem of motor failure in motor-driven steering systems is a significant one. The problem is aggravated when the motor is in continuous use as the electric current flowing through the motor causes it to heat up even further. Thus, there is a need in the art for a motor-driven power steering system which protects the motor from premature failure at elevated temperature.

SUMMARY OF THE INVENTION

Accordingly, it is the overall object of the present invention to provide an improved electric motor-driven power steering system wherein the motor is protected from premature burn out.

It is a specific object of the present invention to provide a motor-driven power steering system having means for controlling the temperature of the motor.

It is another specific object of the present invention to provide a motor-driven power steering system having means for controlling the motor dependent on the level of torque input to the steering system.

It is a further specific object of the present invention to provide a motor-driven power steering system having means for controlling the motor dependent on the level of current flow through the motor.

It is a still further specific object of the present invention to provide a motor-driven power steering system having means for controlling the motor dependent on the rate of temperature change of the motor.

It is another specific object of the present invention to provide a motor-driven power steering system having means for controlling the motor dependent on the temperature of the motor and the temperature of the air adjacent the motor.

It is another specific object of the present invention to provide a motor-driven power steering system having means for controlling the motor dependent on the level of torque input to the steering system, the level of current flow through the motor and the rate of temperature change of the motor.

These and other objects of the present invention are achieved as follows.

The temperature of an electric motor is given by the relationship:

$$\theta m = W/Rt = (Wm + Wi + Wc)/Rt \tag{1}$$

where:
- $\theta m$ is the temperature of the motor
- W is the total loss of heat of the motor
- rt is the heat resistance of the motor
- Wm is the heat generated by friction in the motor (often called the mechanical losses)
- Wi is the iron loss of the motor, and
- Wc is the heat generated by current flow through the motor (often referred to as the copper or $I^2R$ loss)

The values for Wm and Wi are usually negligible compared to the value for Wc and therefore, can be ignored. Thus, the above relationship can be rewritten as follows:

$$\theta m = Wc/Rt = (Ia^2 * Ra)/Rt \tag{2}$$

where:
- Ia is the current flow through the motor armature, and
- Ra is the resistance of the armature.

Assuming that the heat/time constant of the motor is T, the change in temperature of the motor over time may be expressed as follows:

$$\theta = \Theta m (1 - e^\alpha) \tag{3}$$

$$= Ia^2 (Ra/Rt)(1 - e^\alpha) \tag{4}$$

$$= k * Ia^2 (1 - e^\alpha) \tag{5}$$

where:

$$\alpha = -t/T \tag{6}$$

$$k = Ra/Rt \tag{7}$$

It has been found that if motor temperature is maintained below a predetermined level, the operating life of the motor is substantially increased. As can be seen from formula 2 above, the level of current flow through the motor is a significant factor with respect to motor temperature. An increase in current flow results in a corresponding increase in temperature. Thus, in accordance with the present invention, when motor temperature exceeds a first predetermined level, current flow through the motor is reduced. The degree of reduction is proportional to the difference between motor temperature and the predetermined temperature. Where the difference is large, the degree of reduction is correspondingly large. The reduction in motor current thus permits the motor to cool to a safer temperature, thereby prolonging operating life. If the temperature of the motor reaches a higher second predetermined temperature, current flow through the motor is completely turned off.

A motor-driven power steering system is therefore provided which is not subject to premature failure due to burn out of the motor. Such a system can thus be used with the requisite confidence that a pwoer steering system should have.

DESCRIPTION OF THE PREFERRED EMBODIMENT

Figure 1:
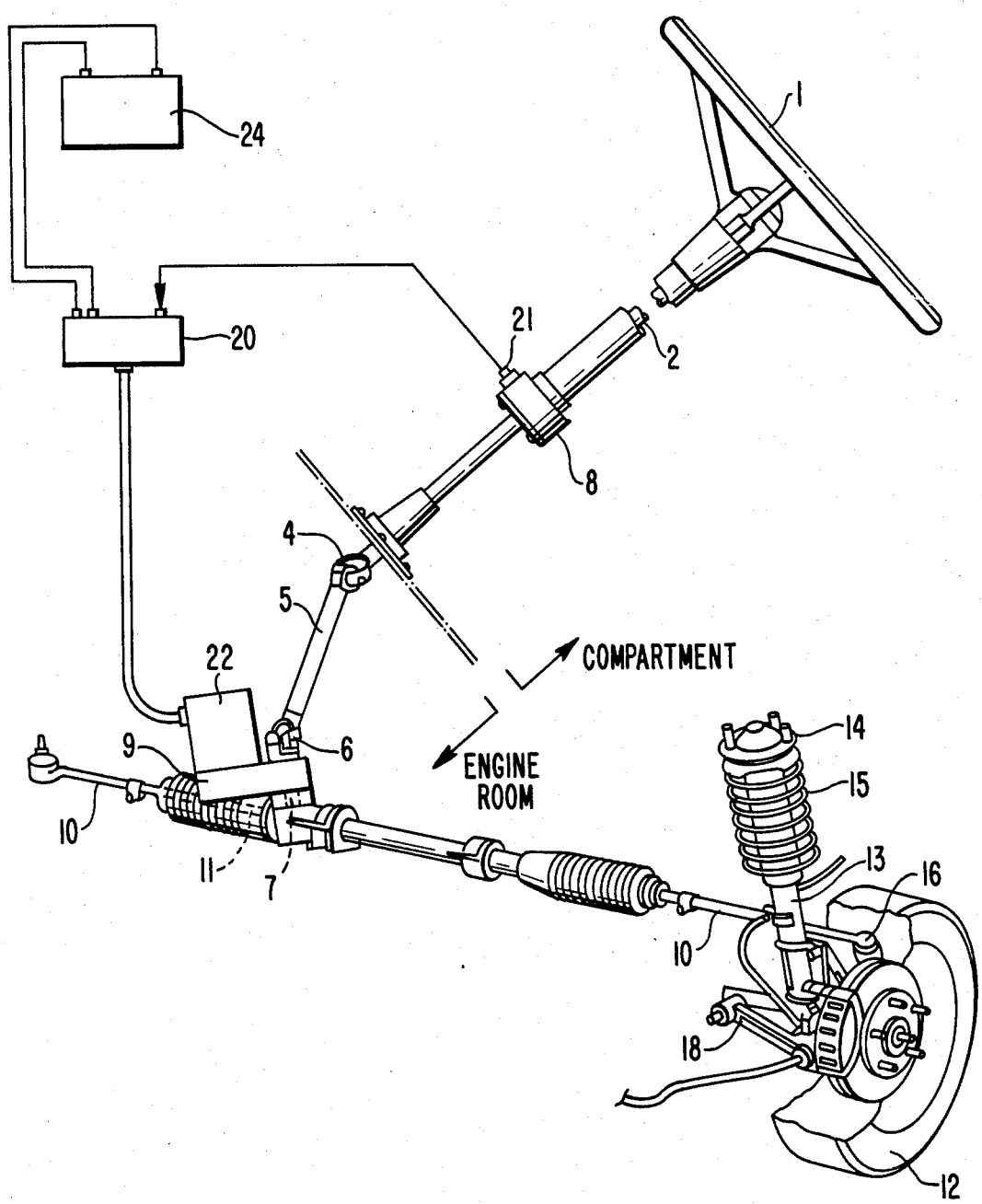
FIG. 1 is a constructional schematic diagram of a power steering system in accordance with the present invention.

With reference to FIG. 1, there is shown a constructional schematic view of an embodiment of a motor-driven power steering system in accordance with the present invention. Steering wheel 1 is connected to one end of first steering shaft 2. The other end of first steering shaft 2 is connected to one end of second steering shaft 5 through first universal joint 4. The other end of second steering shaft 5 is connected to one end of third steering shaft 7 through second universal joint 6. The other end of third steering shaft 7 is attached to a pinion gear (not shown) which engages rack 11. Rack 11 is coupled to tie rod 10 and tie rod 10 is coupled to steering knuckle arm 16 for controlling the steering direction of tire 12. Reference numerals 13, 14, 15 and 18 designate a shock absorber, a suspension upper support, a coil spring and a lower suspension arm, respectively.

Torque sensor 8 is attached to first steering shaft 2 and comprises four strain gauges. Output terminal 21 of sensor 8 is connected to controller 20. Controller 20 controls the operation of the steering system as will be presently described.

Between the pinion gear disposed on third steering shaft 7 and second universal joint 6, there is attached torque transmission gear mechanism 9 which couples the steering shaft 7 to the driving shaft of D.C. servomotor 22. Servomotor 22 is electrically coupled to controller 20.

Thermistor 23 is provided on the housing of motor 22 for detecting the surrounding temperature. Thermistor 23 is also connected to controller 20. Electrical power for operating controller 20 is provided by battery 24. Battery 24 may be the primary battery of the host vehicle or may be a separate battery dedicated to controller 20.

Figure 2:
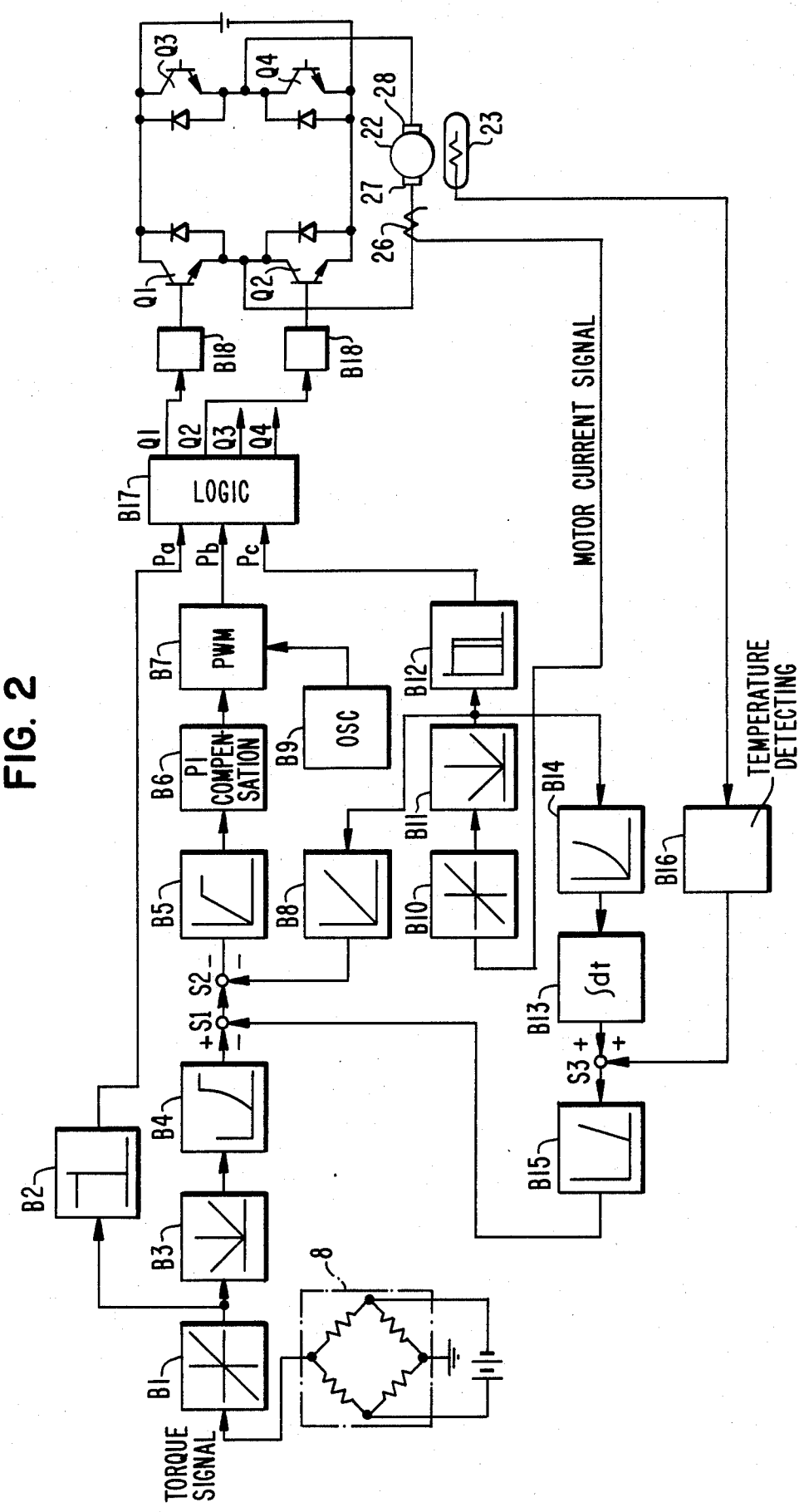
FIG. 2 is a block diagram illustrating the control circuit for the power steering system of FIG. 1.
Figure 3:
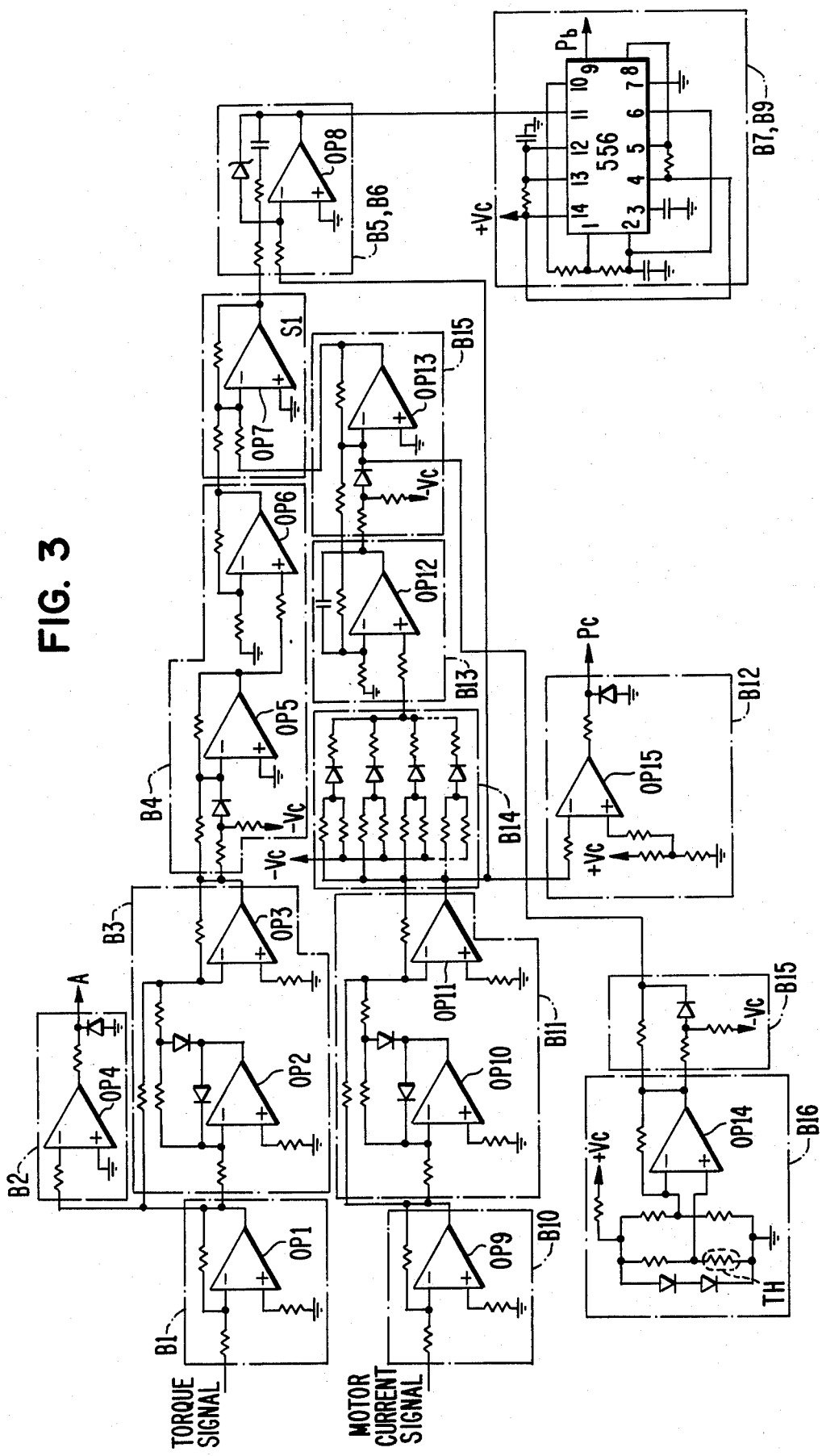
FIGS. 3 and 4 are schematic diagrams illustrating the circuit elements of the blocks in FIG. 2.
Figure 4:
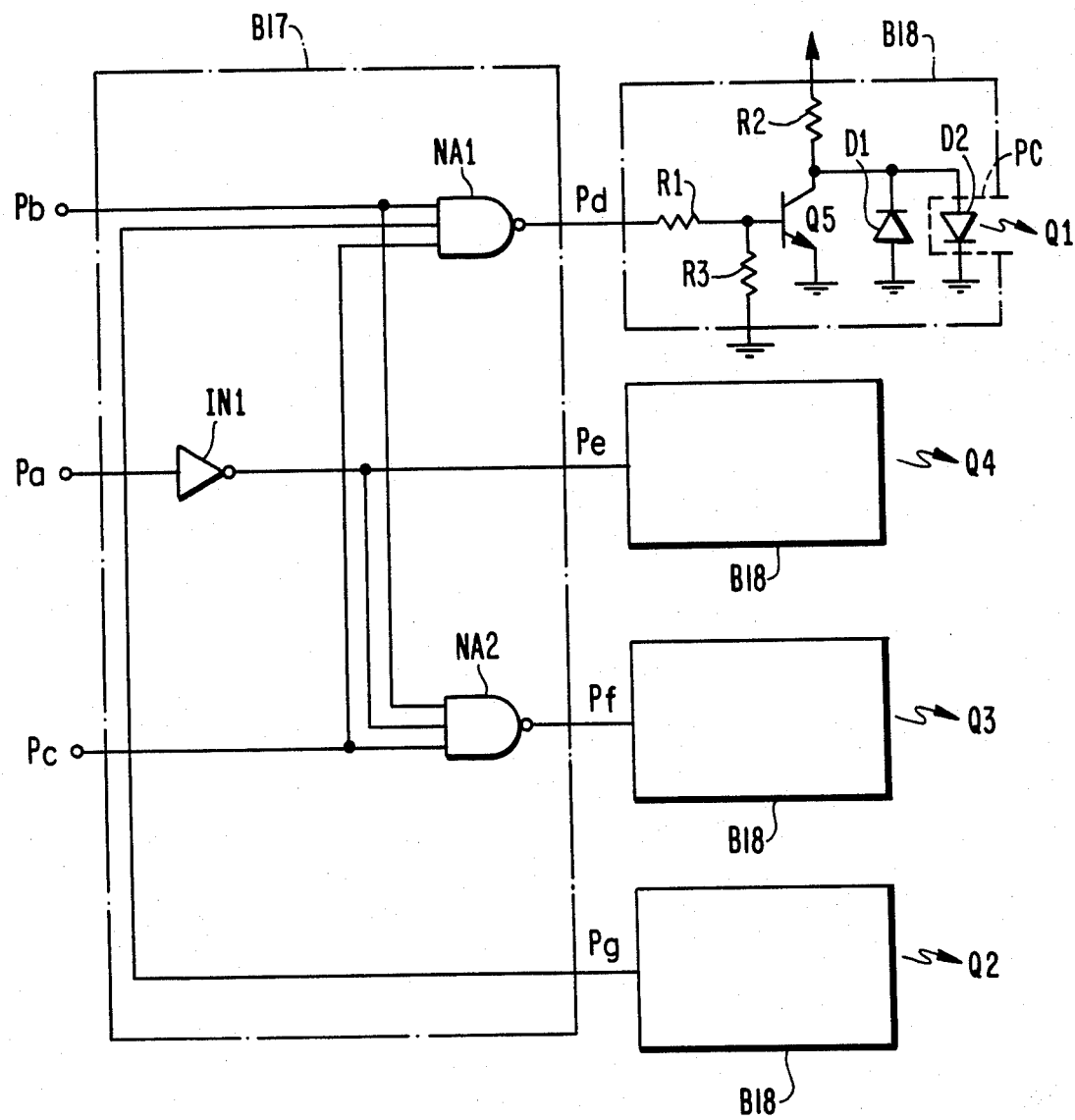

With reference to FIG. 2, there is shown a schematic block diagram illustrating one embodiment of an electrical circuit for controller 20 shown in FIG. 1. FIGS. 3 and 4 show details of the respective blocks in FIG. 2. The graph illustrated in each of the blocks in FIG. 2 show the relationship between the input signal level and the output signal of the associated block. The input signal is plotted along the abscissa and the output signal is plotted along the ordinate. Also note that in the electrical circuit diagrams shown in FIGS. 3 and 4, a resistor is illustrated by a small rectangular mark.

With reference to FIG. 2, the construction and operation of controller 20 will be described. Torque sensor 8, fixed to first steering shaft 2, forms a bridge circuit with output terminal 21 connected to the input terminal of block B1. Block B1 comprises a linear amplifier and an output terminal thereof is connected to an input terminal of each of blocks B2 and B3. Block B2 comprises an analog comparator which determines the polarity of an input signal thereof and outputs a binary signal based on the determination. Block 3 comprises an absolute value circuit which at all times outputs a positive polarity signal having the same level as that of its input signal regardless of the polarity of its input signal. Therefore, at the output terminal of block B2 there is obtained a signal representing the polarity of the manual steering torque applied to first steering shaft 2 (FIG. 1) by a driver and at the output terminal of block B3 there is obtained a signal representing the absolute value of this manual steering torque.

The output terminal of block B2 is connected to input terminal Pa of block B17. Block B17 will be described in detail below. The output terminal of block B3 is connected to the input terminal of block B4. Block B4 comprises a function generator which produces a 0 output signal level when its input signal is below a predetermined level. When the input signal is above the predetermined level, an output signal is produced as a function of the input signal.

The output terminal of block B4 is coupled to the input terminal of differential amplifer S1. The output terminal of block B15 is coupled to the same terminal.

The output terminal of differential amplifier S1 is coupled to the input terminal of differential amplifier S2 along with the output terminal of block B8. The output terminal of differential amplifier S2 is coupled in turn to the input terminal of block B5. Block B5 comprises an amplifier with a limiter, the output terminal of which is coupled to the input terminal of block B6. Block B6 comprises a proportion and integration (compensating) circuit, the output of which is coupled to block B7.

In the present invention, the current flowing through D.C. servomotor 22 is repetitiously switched on and off at a predetermined duty cycle. The duty cycle is varied to adjust the torque generated by the servomotor. Block B7 comprises a pulse width modulation (PWM) circuit for controlling the duty cycle of servomotor 22. This PWM circuit modulates the pulse width of a square-wave generated from the oscillator in block B9 in accordance with the level of the signal received from block B6. Thus, the duty cycle of the signal appearing at the output of block B17 is controlled by the signal received from block B6. The output terminal of block B7 is coupled to input terminal Pb of block 17.

Block 17 is set forth in more detail in FIG. 4. As shown, block 17 comprises a logic circuit have invertor IN1 and NAND gates NA1 and NA2. These logic elements operate in conventional fashion whereas the logic level at the input of inverter IN1 is inverted at its output and NAND gates NA1 and NA2 provide a logic LO (low level) at their outputs only when all of their inputs are at a logic HI (high level). Block 17 also includes input terminals Pa, Pb and Pc and output terminals Pd, Pe, Pf and Pg.

The outer terminals of block B17 are coupled to respective drivers B18. Each driver is identical in construction and comprise resistors R1, R2 and R3, transistor Q5 and diodes D1 and D2. Diode D2 forms part of a photo coupler which couples drivers B18 to respective base electrodes of transistors Q1 through Q4 as shown in FIG. 2. Transistors Q1 through Q4 are used to control servomotor 22 as will be described presently.

Again with reference to FIG. 2, current detector 26 is a current transformer connected to measure the level of current flow through servomotor 22. The output detector 26 is coupled to block B10. Block B10 comprises a linear amplifier, the output of which is coupled to the input terminal of block B11. Block B11 comprises an absolute value circuit, i.e., the same as block B3. The output of block B11 is coupled to the input terminal of blocks B8. The output terminal of block B8 is coupled to differential amplifier S2 as explained above and provides an indication of the output level of the steering system based on the level of current flow through servomotor 22.

The output terminal of block B11 is also coupled to block B14. Block B14 comprises a plurality of diodes and resistors which provide an output signal level proportional to the square of its input signal.

The output of block B14 is connected to the input terminal of block B13. Block B13 integrates the signal received from block 14 and couples it to an input terminal of differential amplifier S3. The output terminal of block B16 is also coupled to differential amplifier S3. Block B16 is a temperature detector comprising an amplifier circuit which is connected to thermistor 23 mounted on the housing of servomotor 22.

The output terminal of differential amplifier S3 is coupled to the input terminal of block B15. Block B15 comprises a function generator similar in characteristics to the function generator in block B4. As long as the temperature of servomotor 22 is below a predetermined value T1, which is lower than a maximum allowable temperature T2 of servomotor 22, the output signal level of block B15 is zero. As the temperature of the servomotor rises above T1, the level of the output signal of block B15 increases as a function of the increase in temperature. The output terminal of block B15 is coupled to differential amplifier S1 as discussed above.

The output terminal of block B11 is also coupled to block B12. Block B12 comprises an analog comparator which has a hysterisis characteristic and prevents an overflow of current through servomotor 22. When the current flow exceed a predetermined value, the output of the comparator supplies a LO logic level to input terminal Pc of block B17, thus causing an interruption in the flow of current to servomotor 22 as will be described below.

The operation of the logic circuit in block B17 will now be described with reference to FIGS. 2 and 4. As discussed above, the logic circuit includes logic inputs Pa, Pb and Pc. Input Pa is coupled from the output of block B2 which is a logic HI or LO depending on the direction of system torque, i.e., whether the steering wheel is being turned to the left or to the right. Input Pb is coupled from the output of block B7 which is a succession of transitions between logic HI and LO at a duty cycle depending on the level of desired output torque of servomotor 22. Input Pc is coupled from the output of block B12 and is also a logic HI or LO depending on the level of current flow through servomotor 22.

For purposes of explanation, it can be assumed that at some point in time, input Pa will be at a logic HI, indicating that system torque is in a first direction; input Pb will be at a logic HI, indicating that servomotor 22 should be "on", and input Pc will also be at a logic HI indicating that the current flow through servomotor 22 is below the second predetermined maximum level T2. Thus, with all inputs at a logic HI, outputs Pd and Pe will be at a logic LO and outputs Pf and Pg will be at a logic HI. Because a logic inversion occurs in drivers B18, the logic levels presented to the base electrodes of transistors Q1 and Q4 will be HI while the logic levels presented to the base electrodes of transistors Q2 and Q3 will be LO. Thus, transistors Q1 and Q4 will be turned on and transistors Q2 and Q3 will be turned off. Accordingly, current from battery 24 flows through transistor Q1 to terminal 27 of servomotor 22, through the servomotor to terminal 28 and through transistor Q4 to the other side of battery 24. Thus servomotor 22 is turned on and will rotate in a first direction, e.g., clockwise. Transistor Q1 will remain in a conductive state until the signal at input terminal Pb changes to a logic LO. When this occurs, the output of NAND gate NA1 becomes HI and the output of its associated B18 driver becomes LO, thus turning off Q1. When Q1 turns off, the current path to servomotor 22 is interrupted, thus causing the motor to slow down. This condition continues until the signal at input terminal Pb changes back to a logic HI. Transistor Q1 is turned on again and current flow is restored through the servomotor. Thus, by varying the duty cycle of the signal at input terminal Pb of block B17, current flow to servomotor 22 is turned on and off to achieve a desired output torque of the servomotor.

Servomotor 22 continues to rotate in a clockwise direction while the signal at input terminal Pa of block B17 is at a logic HI. When this signal changes to a logic LO, indicating that the steering wheel is being turned in the opposite direction, the outputs of the B18 drivers associated with output terminals Pd and Pe will change to a low logic state and the outputs of the B18 drivers associated with output terminals Pf and Pg will change to a high logic state, assuming that inputs Pb and Pc are HI. Therefore, transistors Q1 and Q4 will be turned off and transistors Q2 and Q3 will be turned on. Thus, a current path is established from one side of battery 24, through transistor Q3 to terminal 28 of servomotor 22, through the servomotor to terminal 27, through transistor Q2 and back to the other side of battery 24. Thus, the flow of current through servomotor 22 is now in the reserve direction and the motor will turn in the counterclockwise direction. Therefore, the direction of rotation of servomotor 22 can be changed by changing the logic state of input terminal Pb.

When the flow of current through servomotor 22 exceeds the second predetermined level T2, the logic level at input terminal Pc changes to a logic LO. When this occurs, NAND gates NA1 and NA2 change to a logic HI and their associated drives B18 change to a logic LO. Thus, transistors Q1 and Q3 are turned off. Therefore, the flow of current to servomotor 22 is interrupted regardless of the conductive state of transistors Q2 and Q4.

Figure 5:
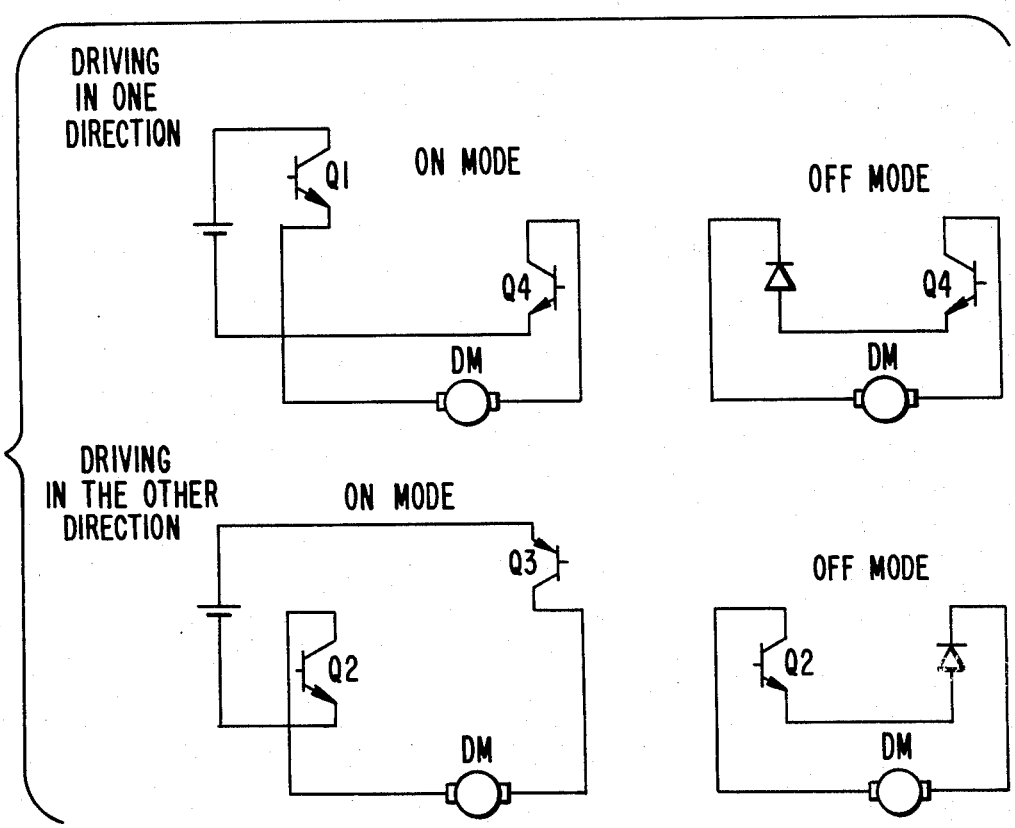
FIG. 5 is a schematic diagram illustrating the transistor drivers associated with each mode of operation of the servomotor used to drive the power steering system of the invention.
Figure 6:
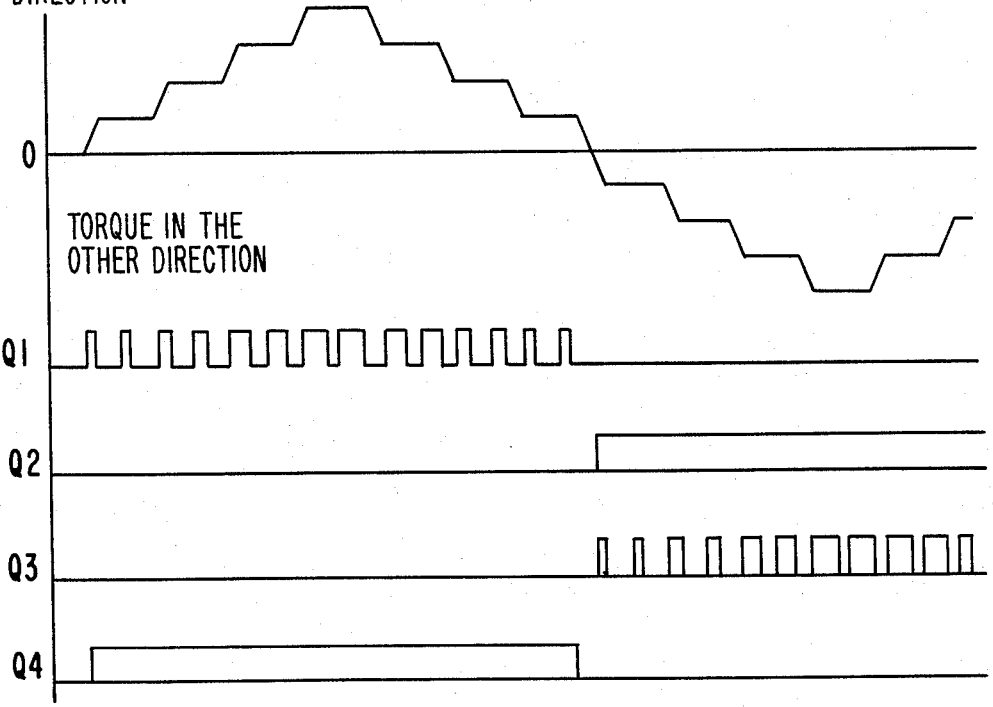
FIG. 6 is a graphical representation of the conductive states of the transistors shown in FIG. 5 with respect to level and polarity of torque.

FIG. 5 is a partial schematic of the driver circuit for servomotor 22 showing which transistors Q1–Q4 are associated with each mode of operation. FIG. 6 illustrates, by graphical representation, the conductive states of transistors Q1–Q4 with respect to level and polarity of torque. Note that at low levels of positive torque, the duty cycle, or "on time" of transistor Q1 is relatively short but increases as the level of torque increase. The duty cycle of transistor Q3 has the same characteristic with respect to negative levels of torque.

The operation of the power steering system in accordance with the present invention will now be described with reference again to FIG. 2. When the vehicle driver turns the steering wheel, servomotor 22 is driven by controller 20 to assist the steering operation of the vehicle. The amount of torque that the motor is to produce is determined by the amount of torque input to the system by the driver, the level of current flow through the servomotor and servomotor temperature.

The input torque is detected by torque detector 8 and is processed by block B2 to determine its polarity, i.e., direction, and by block B3 to determine its absolute value level. The input signal is further processed by a function generator which produces a 0 level output when the input torque is below a predetermined value and at all other times produces an output level corresponding to a predetermined function of the input torque (B4). The level of current flow through servomotor 22 is also detected (B10, B11) and is processed by block B14 to produce a signal which is the square of the current signal times the resistance of the servomotor (B14). This signal represents the Ia$^2$ * Ra heat (copper loss) of the servomotor due to current flow through the armature. The signal is further processed by integration to determine the temperature change or heat loss of the motor over time (B13). This signal is combined with the temperature signal of the ambient air (B16) to arrive at a motor temperature signal. The motor temperature signal is processed by a function generator to produce a 0 level output when the motor temperature is below the predetermined value (T1) and at all other times produce an output level corresponding to a predetermined function based on the difference between the motor temperature and predetermined temperature T1 such that the greater the difference, the greater the output level. The resulting signal is substractively combined with the input torque signal (S$_1$). The resulting signal is combined with the servomotor current signal. The servomotor current signal is also an indication of output torque of the servomotor. The combined signal is processed to provide a square wave having a duty cycle dependent on the level of the combined signal (blocks B5, B6 and B7). This square wave signal is supplied to input terminal Pb of block B17 for controlling servomotor 22 as described above, with the result being that the output torque of servomotor 22 is reduced as motor temperature increases above T1.

When temperature T1 of servomotor 22 reaches the second predetermined temperature T2, as indicated by the over current flow signal supplied to input terminal PC of block B17, the current flow to the servomotor is interrupted to allow the motor to cool down.

Figure 7:
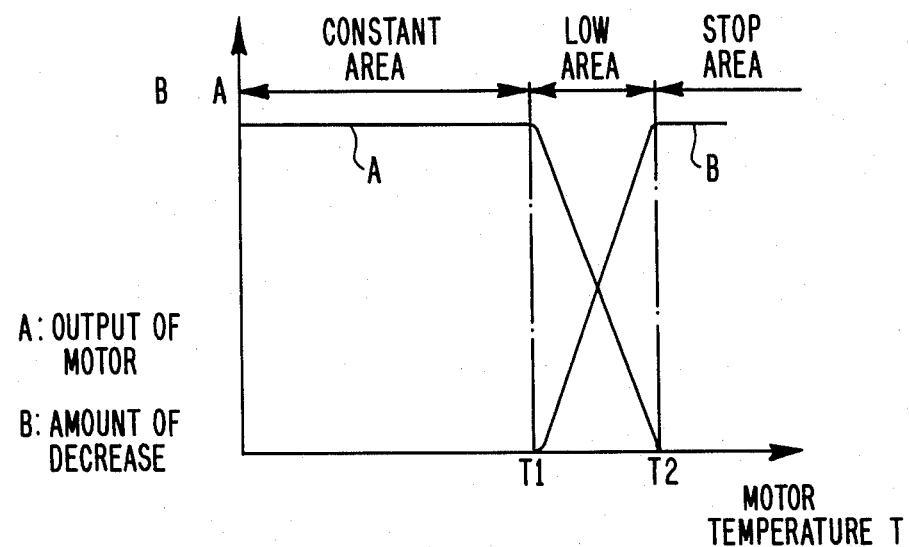
FIG. 7 is a graphical representation of servomotor torque and torque degree as a function of servomotor temperature.

As shown in FIG. 7, output torque A of servomotor 22 is constant when the temperature of the motor is below temperature T1. Thus, during this period, the output torque of the servomotor is essentially that commanded by the vehicle driver turning the steering wheel. As the temperature of the servomotor increases to temperature T1, however, the output torque decreases as the motor temperature approaches maximum temperature T2. When T2 is reached, the output torque is reduced to zero as the supply of current to the servomotor is interrupted.

Figure 8:
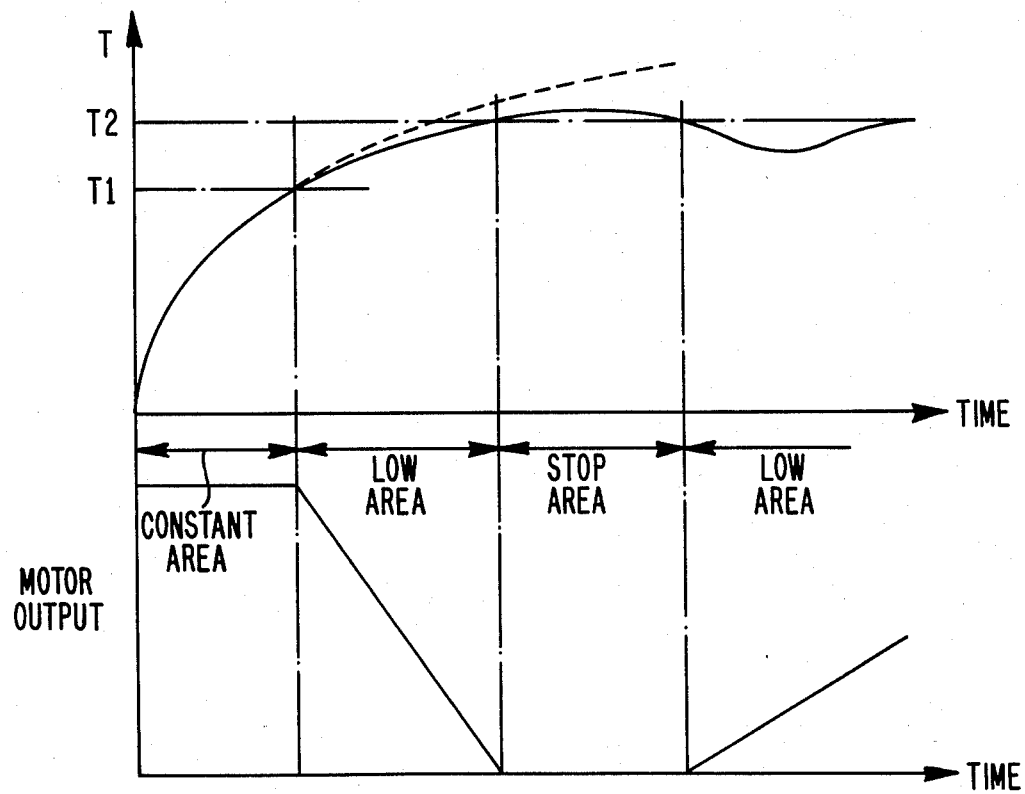
FIG. 8 is a graphical representation of servomotor torque as a function of temperature and time.

FIG. 8 graphically illustrates the relationship between servomotor temperature and servomotor output torque over time. When the input torque to the system is constant, as commanded by the driver, servomotor output torque is also constant when motor temperature is below T1. If the torque output of the motor remains constant, motor temperature continues to increase as indicated by the dotted line in FIG. 8. Torque output, however, is reduced when the motor temperature exceeds T1. Thus, motor temperature decreases as shown by the solid temperature curve in FIG. 8. If the motor temperature increases above T2, current flow to the motor is interrupted and remains off until the temperature decreases below T2. In the worst case condition, motor temperature will fluctuate around T2 and the servomotor will be intermittently operated. It has been found, however, that motor temperature increases gradually and seldom exceeds T2. Thus, it is infrequent that servomotor operation is completely disabled.

Figure 9:
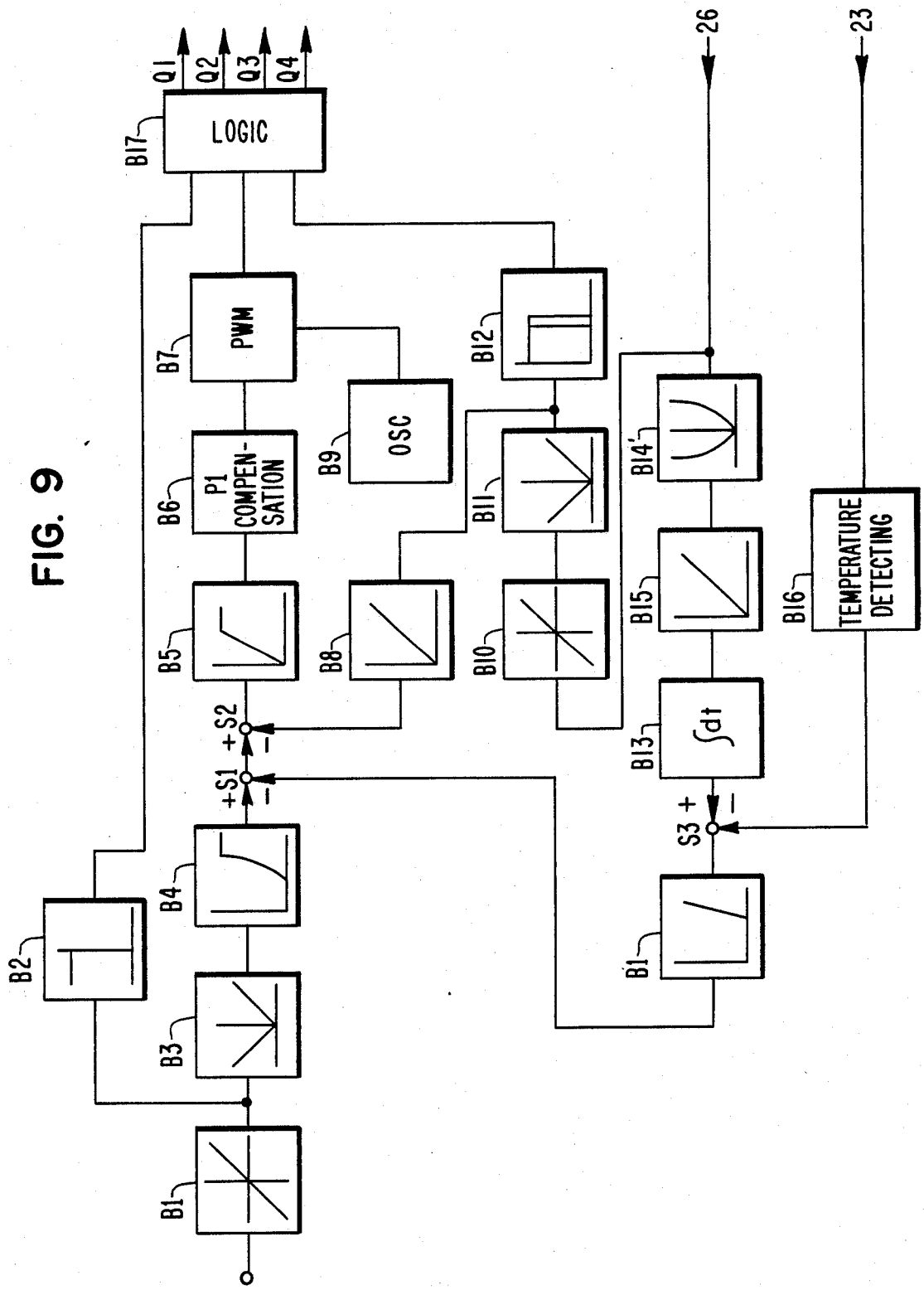
FIGS. 9, 10 and 11 illustrate other embodiments of the control system for controlling the servomotor.
Figure 10:
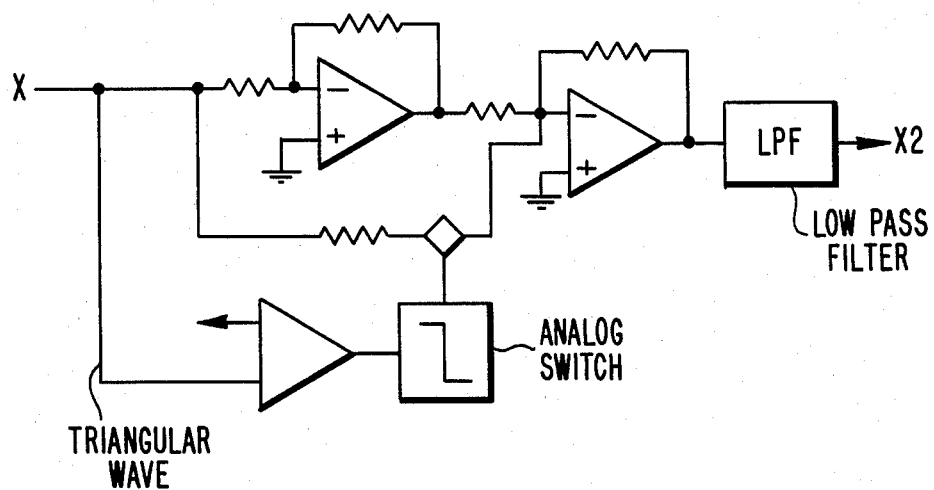

FIG. 9 illustrates another embodiment of servomotor controller 22 in accordance with the present invention. In this embodiment, the signal from current detector 26 is supplied directly to block B14'. Thus, the signal processed by blocks B13, B14' and B15 is not necesarily a positive absolute value as the signal was not processed by the absolute value circuit in block B11. Accordingly, signals from current detector 26 may be processed by blocks B13, B14' and B15. A schematic diagram of block B14' in accordance with this embodiment is illustrated in FIG. 10.

Figure 11:
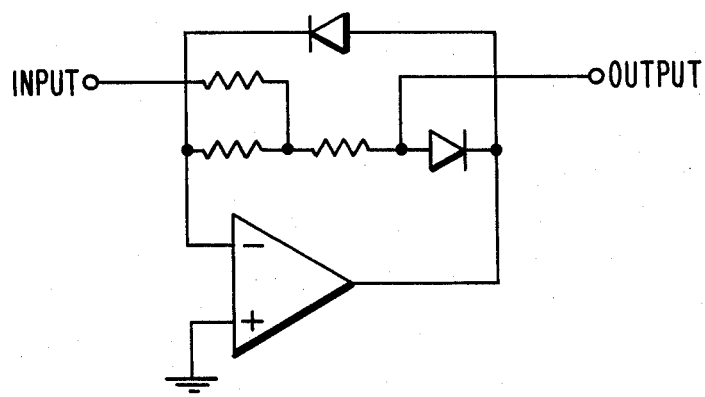

FIG. 11 illustrates an alternative embodiment of the absolute value circuit in blocks B3 and B11.

Thermistor 24 is provided directly on the housing of servomotor 22 as shown in FIG. 1. However, it will be necessary to provide insulator between the housing and the thermistor if the temperature of the housing becomes greater than that of the servomotor. It may be possible to omit thermistor 22 and regard the temperature of the servomotor itself as being the surrounding temperature.

The preferred invention has been described in detail in connection with preferred embodiment. These embodiments, however, are merely for example only and the invention is not restricted thereto. It will be understood by those skilled in the art from a reading of the specification and claims that other variations and modifications can be made within the scope of the present invention as defined by the appended claims.

We claim:
1. An electric power steering device for a vehicle, said device comprising:
 an electric motor;
 actuation means for driving said motor;

coupling means for coupling a steering means to said electric motor;

torque detecting means for detecting the steering torque manually applied to said steering means by a driver and producing a torque signal;

current detecting means for detecting the level of current flow through said electric motor;

current processing means coupled to said current detecting means for providing an output current signal proportional to the square of said level of current flow; and control means for controlling the power of said actuation means in response to said torque signal and said current signal.

2. An electric power steering device in accordance with claim 1, wherein
said current signal is a function of the temperature of said electric motor, said control mean reducing the power of said actuation means when the motor temperature exceeds a first predetermined level.

3. An electric power steering device in accordance with claim 2, wherein
said control means reduces the power of said actuation means as a function of the diference between the motor temperature and said first predetermined temperature.

4. An electric power steering device in accordance with claim 2 wherein
said control means further reduces the power of said actuation means to prohibit drive of said electric motor when said curent signal exceeds a predetermined level.

5. An electric power steering device in accordance with claim 1, said device further comprising:
temperature detecting means for detecting the temperature adjacent said electric motor and producing a temperature signal, said control means controlling said actuation means to drive said electric motor in response to said torque signal, said current signal and said temperature signal.

6. An electric power steering device in accordance with claim 1, said device further comprising:
polarity means for detecting the direction of torque detected by said torque detecting means and producing a polarity signal, wherein said control means controls said actuation means for driving said electric motor in a predetermined direction in response to said polarity signal.

7. An electric power steering device for a vehicle, said device comprising:
an electric motor;
actuation means for driving said motor;
coupling means for coupling a steering means to said electric motor;
torque detecting means for detecting the steering torque manually applied to said steering means by a driver and producing a torque signal;
current detecting means for detecting the level of current flow through said electric motor and producing a current signal;
control means for controlling the power of said actuation means in response to said torque signal and said current signal;
polarity means for detecting the direction of torque detected by said torque detecting means and producing a polarity signal, wherein said control means controls said actuation means for driving said electric motor in a predetermined direction in response to said polarity signal; and wherein said control means comprises:
a torque signal processing means coupled to said torque detecting means which produces a non-linear steering torque signal in response to an absolute value of said torque signal and which produces a bistate polarity signal in accordance with the polarity of said torque signal;

current signal processing means coupled to said current detecting means which produces an absolute value signal of current flow through said electric motor and which produces an overcurrent signal when said current signal exceeds a predetermined level;

temperature processing means coupled to said temperature detecting means which produces an absolute value signal of the temperature level adjacent said electric motor;

first differential signal processing means coupled to said current signal processing means and to said temperature processing means for producing a first differential output signal representing the absolute value of the difference between said current signal and said temperature signal;

second differential signal processing means coupled to said torque signal processing means, said current signal processing means and the output of said first differential signal processing means for producing a second differential output signal representing the difference between said torque signal, said current signal and said output of said first differential signal processing means;

a pulse width modulation circuit which performs pulse width modulation in response to the level of the output signal from said second differential amplifier circuit;

a logic control circuit to which said polarity signal, the output signal of said pulse width modulation circuit and said overcurrent signal are coupled and which produces a plurality of predetermined output signals in response to said input signals; and a motor drive circuit connected to said logic control circuit which supplies load current to said electric motor in response to the output signals of said logic control circuit.

8. An electric power steering device in accordance with claim 7, wherein
said torque signal processing means comprises;
a linear amplifier which amplifies the output signal of said torque detecting means;
an absolute value circuit connected to an output terminal of said linear amplifier to produce a signal representing an absolute value of an input signal;
a function generator connected to said abolute value circuit and produces a signal of a predetermined function with respect to an input signal; and
a polarity judging circuit connected to said linear amplifier circuit and produces a binary signal in response to the polarity of the input signal.

9. An electric power steering device in accordance with claim 7, wherein
said curent signal processing means comprises:
a current transformer connected to said electric motor to detect the load current flowing through said electric motor;
a linear amplifier connected to said current transformer;

an absolute value circuit connected to an output terminal of said linear amplifier to produce a signal representing an absolute value signal of an output signal from said linear amplifier; and an overcurrent detecting means connected to said absolute value circuit.

10. An electric power steering device in accordance with claim 7, wherein said motor drive circuit comprises:

a switching circuit which supplies a load current to said electric motor the duty ratio of which is controlled in response to the output signal from said logic control circuit.

11. A method for controlling the motor of an electric power steering system, said method comprising the steps of:

coupling an actuation means to said electric motor;
coupling a steering means to said electric motor;
detecting the steering torque manually applied to said steering means by a driver and producing a torque signal;
detecting the level of current flow through said electric motor;
processing said level of current flow to provide an output current signal proportional to the square of said level of current flow; and
controlling the power of said actuation means on response to said torque signal and said current/signal.

12. The method of claim 11 further comprising the steps of:

detecting the level of the temperature adjacent said electric motor and producing a temperature signal; and
controlling the power of said actuation means in response to said torque signal, said current signal and said temperature signal.

13. The method of claim 11 further comprising the steps of:

detecting the direction of said torque signal and producing a polarity signal; and
controlling the power of said actuation means for driving said electric motor in a predetermined direction in response to said polarity signal.

14. The method of claim 11 further comprising the steps of:

detecting when said current signal exceeds a predetermined level; and
controlling the power of said actuation means to prohibit drive of said electric motor when said current signal exceeds said predetermined level.

15. An electric power steering device in accordance with claim 1 wherein said current processing means includes integrating means for integrating the square of said level of current flow to provide said output current signal.

16. An electric power steering device in accordance with claim 1 further including differentiating means coupled to said torque detecting means and said current processing means for providing a differential signal from said torque signal and said current signal.

17. An electric power steering device for a vehicle, said device comprising:

an electric motor;
actuation means for driving said motor;
coupling means for coupling a steering means to said electric motor;
torque detecting means for detecting the steering torque manually applied to said steering means by a driver and producing a torque signal;
current detecting means for detecting the level of current flow through said electric motor and producing a current signal;
temperature detecting means for detecting the temperature adjacent said electric motor and producing a temperature signal;
current processing means coupled to said current detecting means for producing an overcurrent signal when said current signal exceeds a predetermined level;
differential signal processing means coupled to said torque detecting means, said current detecting means and said temperature detecting means for producing a differential signal in response to said torque signal, said current signal and said temperature signal;
control means for controlling the power of said actuation means in response to said differential signal and for preventing the operation of said electric motor in response to said overcurrent signal.

* * * * *